United States Patent [19]

Morman

[11] 3,923,532

[45] Dec. 2, 1975

[54] ZINC LIGNOSULFONATE STABILIZING BINDER SOLUTION FOR MAGNESIUM OXIDE REFRACTORY FORMING MIXTURES AND METHOD

[75] Inventor: Frank C. Morman, Wausau, Wis.

[73] Assignee: American Can Company, Greenwich, Conn.

[22] Filed: Oct. 21, 1974

[21] Appl. No.: 516,437

[52] U.S. Cl. ............... 106/59; 106/58; 106/63; 106/123 LC
[51] Int. Cl.[2] ............... C04B 35/04; C04B 35/12
[58] Field of Search ... 106/58, 59, 63, 108, 123 LC, 106/60, 61, 62, 106, 107, 105

[56] References Cited
UNITED STATES PATENTS

| | | | |
|---|---|---|---|
| 1,525,328 | 2/1925 | Sheaffer | 106/60 |
| 2,457,357 | 12/1948 | Fenn | 106/123 LC |
| 2,579,482 | 12/1951 | Fenn | 106/123 LC |
| 2,804,392 | 8/1957 | Schurecht | 106/46 |
| 3,141,790 | 7/1964 | Davies et al. | 106/59 X |
| 3,194,672 | 7/1965 | Davies et al. | 106/59 |
| 3,248,241 | 4/1966 | Rifai | 106/62 |
| 3,392,037 | 7/1968 | Neely et al. | 106/58 |
| 3,788,868 | 1/1974 | Kitsuda | 106/90 |

OTHER PUBLICATIONS
Ishikawa, H. et al. "Oxidative Degradation of Lignin VIII, Physical Properties of Sodiumhigonosulfonate & Its Peracetic Degradation Product," Chem. Abstracts 68, (1968), 88329b.
Kirk-Othmer-Encyclopedia of Chemical Technology, Vol. 12, pp. 370–372, Vol. 19, p. 301.

*Primary Examiner*—Helen M. McCarthy
*Attorney, Agent, or Firm*—Robert P. Auber; Ira S. Dorman; John M. Winter

[57] ABSTRACT

Refractory shapes containing magnesium oxide are pressed from a refractory forming mixture which consists of particulate refractory material containing magnesium oxide and a binder solution of zinc lignosulfonate in water. The use of zinc lignosulfonate in solution as a binder stabilizes the refractory forming mixture, to substantially prevent the loss of density of refractory shapes as the refractory forming mixture ages. Zinc may alternatively be provided in the binder solution by adding a zinc compound to a binder solution composed of water and lignosulfonate salt, the zinc compound dissociating in solution to provide zinc ions. A refractory forming mixture is prepared by mixing zinc lignosulfonate, water, and particulate refractory material containing magnesium oxide, or by mixing a lignosulfonate salt, water, a zinc compound which dissociates in solution to provide zinc ions, and particulate refractory material containing magnesium oxide.

12 Claims, No Drawings

ZINC LIGNOSULFONATE STABILIZING BINDER SOLUTION FOR MAGNESIUM OXIDE REFRACTORY FORMING MIXTURES AND METHOD

BACKGROUND OF THE INVENTION

1. Field of the Invention

This invention pertains generally to the manufacture of high density basic refractory shapes containing mangesium oxide, and more particularly pertains to a magnesium oxide containing refractory forming mixture having a prolonged period of workability and to a method for producing the same.

2. Description of the Prior Art

The mineral magnesia, or magnesium oxide, has a strongly basic chemical character plus an extremely high temperature of fusion. Thus, refractory bricks or shapes containing magnesia have been very useful in such applications as steel making and in other processes where basic fluxes or other basic material at a high temperature is in contact with the refractory.

Refractory shapes containing magnesia may be produced by chemically or ceramically bonding the particulate refractory material together. In each case, small amounts of a "binder" liquid are mixed with the refractory particles and the mixture is pressed into bricks at high pressure. The binder liquid lubricates the refractory particles during the pressing operation and helps to hold the particles together after the bricks come out of the press. Ceramically bonded brick is fired before being placed into service to cause a ceramic bond to form between the refractory particles. Chemically bonded refractory brick is placed into service without firing, and gains strength in service as it is exposed to high temperatures. The resulting refractory bricks are preferably resistant to mechanical spalling and thermal breakup, and are also preferably low in porosity.

In general, the quality of refractory bricks is directly related to the density of the pressed brick, with greater temperature resistence and longer brick life being associated with bricks of higher density. The bricks are therefore generally formed at, or near, the highest feasible pressure of the available pressing eqipment. Magnesia refractory bricks are often pressed from a refractory forming mixture which consists largely of magnesium oxide, with the possible presence of various amounts of chrome ore, or chomite, to give certain desirable properties. Water alone may be added to help bind the mixture together, although it is customary to utilize a solution of water and a soluble solid binder to bind the refractory mixture, thereby producing refractory bricks of higher density for a given molding pressure, and also increasing the green strength of the bricks after they come out of the press. A solid binder material that is commonly used is a lignosulfonate salt, such as calcium or sodium lignosulfonate, which is obtained as a by-product of the digestion of wood by the sulfite process for the production of paper-making cellulose pulp fibers. In commercial practice the whole spent sulfite liquor may be used as a binder, with the sulfite liquor containing wood sugars, etc., in addition to the lignosulfonate. These binder materials are burned off during the firing of the brick, and thus do not have a substantial effect on the properties of the finished refractory brick other than the added density that they allow.

It has been found that refractory forming mixtures containing magnesium oxide and employing a binder solution become stiffer in consistency as they stand over a period of time, thus becoming more difficult to work with. Bricks pressed from refractory forming mixtures that have been standing for a period of time are also found to be a substantially lower in density than those bricks formed from a freshly mixed batch of the refraetory forming mixture. The loss in density of the pressed brick is a serious problem, since the loss of even a few pounds per cubic foot in density can decrease the lifetime and other properties of the finished refractory brick by substantial amounts.

In the past, in order to maintain high quality shapes of the desired density, it has been necessary to either increase the pressure utilized in the pressing operation, or to discard or rework the remaining refractory forming mixture after a relatively short period of time, necessitating more frequent and smaller productions of batches of the refractory mixture. The wasted refractory forming mixture and the extra work involved in producing numerous batches of the refractory mixture have added significantly to the cost of the finished refractory brick.

SUMMARY OF THE INVENTION

I have invented an improved refractory forming mix containing magnesium oxide and a binder solution and a method of making the same, which retains its ability to form high density refractory shapes despite standing for relatively long periods of time. The improved magnesium oxide refractory forming mixture includes a binder solution of zinc compound and a lignosulfonate salt in water solution. Alternatively, zinc lignosulfonate salt dissolved in water may be the binder solution in the refractory forming mixture. I have determined that the time period during which a magnesium oxide refractory forming mixture maintains desirable workability may be substantially extended by the use of such zinc-containing binder solutions.

My method for making the improved refractory forming mixture consists of mixing a zinc compound with a lignosulfonate salt and water to form a binder solution, in which the zinc compound will provide zinc ions. This binder solution is mixed with the particulate refractory material which is primarily magnesium oxide. The same effective result may be obtained by mixing the zinc compound or the lignosulfonate salt, or both, in a dry state with the refractory material before adding water. Alternatively, zinc lignosulfonate salt may be mixed with water to form a binder solution, and this binder solution may be mixed with the refractory forming material to form a refractory forming mixture. The zinc lignosulfonate salt may also be mixed in a dry state with the refractory material before adding water.

Further objects, features, and advantages of my invention will be apparent from the following detailed description wherein preferred embodiments of my invention are exemplified.

DESCRIPTION OF THE PREFERRED EMBODIMENTS

As indicated above, refractory shapes or bricks containing magnesium oxide are conventionally made by pressing at a high pressure a mixture of finely divided refractory material (consisting primarily of crystalline magnesium oxide or periclase), the mixture containing a liquid binder to hold the particles of refractory material together after the pressed brick comes out of the press. The liquid binder is usually a solution of water and a soluble solid binder material which may be a lignosulfonate salt. The purpose of the binder solution is to hold the refractory material together after it comes out of the press, that is, to enhance the "green" strength of the brick, and to increase the density of the brick. The amount of water on the weight of refractory material must be limited, usually to less than about 5% by weight of water to the weight of the refractory material. Although the green density of the pressed bricks increases as the amount of water is increased, the refractory forming mix becomes sticky and inoperable and the increased water also decreases the green strength of the pressed brick. This result may be observed by reference to Table I below, which shows the results of tests on various samples of refractory forming mixture under the conditions therein stated. The specimens tested consisted of a pressed mixture of magnesium oxide and a liquid binder, either water alone, or a solution of water and a lignosulfonate salt. The quantity of water is thus preferably kept between about 1% and about 5% by weight of water on the weight of the magnesium oxide.

Table I

Effect of Water Content on the Density and Green Strength of MgO Specimens; 1.5% Lignosulfonate Salt Binder on Weight of MgO. Specimens Pressed at 10,000 PSI.

| Water Concentration (% on Wt. of MgO) | Density, Lbs/Cu. Ft. | | Green Strength (PSI) (In Compression) | |
|---|---|---|---|---|
| | Initial | After 1 Hr. at Rm. Temp. (20°C.) | Initial | After 1 Hr. at Rm. Temp. (20°C.) |
| 2.0% Water | | | | |
| Water only | 167.0 | 167.7 | 155 | 152 |
| Magnesium Lignosulfonate | 171.4 | 171.5 | 165 | 170 |
| Calcium Lignosulfonate | 171.0 | 171.2 | 280 | 172 |
| 3.0% Water | | | | |
| Water only | 168.7 | 168.9 | 185 | 180 |
| Magnesium Lignosulfonate | 172.6 | 173.0 | 130 | 130 |
| Calcium Lignosulfonate | 172.6 | 172.8 | 165 | 167 |
| 4.0% Water | | | | |
| Water only | 169.8 | 170.2 | 140 | 142 |
| Magnesium Lignosulfonate | 174.0 | 174.5 | 120 | 110 |
| Calcium Lignosulfonate | 174.0 | 174.3 | 105 | 85 |
| 5.0% Water | | | | |
| Water only | 174.6 | 172.6 | 130 | 125 |

The green strength and initial density of pressed refractory bricks which use only water as a binder are not considered completely satisfactory, although a green strength of 100 psi or greater is usually adequate. Both the green strength and the density of the pressed bricks can often be improved by the addition of various solid binders into solution with the water as illustrated by Table I. Various salts of lignosulfonate are commonly utilized for this purpose, since they are effective binders and are readily available as a by-product of the paper-making process. I have made a comparison of the properties of pressed refractory bricks made with various binder solutions from water to various solutions of water and lignosulfonate salts, under the test conditions stated below. The results of this comparison are given in Table II. The binders used in the tests reported in Table II actually consisted of dried spent sulfite liquor which is primarily the lignosulfonate salt shown plus small amounts of impurities such as wood sugars.

Table II

Effect of the Concentration of Various Lignosulfonate Salt Binders on the Density and Green Strength of MgO Specimens; 3.0% Water on Weight of MgO. Specimens pressed at 10,000 PSI.

| Lignosulfonate Binder Concentration (% on Wt. of MgO) | Density, Lbs./Cu. Ft. | | Green Strength (PSI) | |
|---|---|---|---|---|
| | Initial | After 1 Hr. at Rm. Temp. (20°C.) | Initial | After 1 Hr. at Rm. Temp. (20°C.) |
| 0.00% Binder | | | | |
| (Water Only) | 168.8 | 168.9 | 185 | 180 |
| 0.75% Binder | | | | |
| Magnesium Lignosulfonate | 170.9 | 171.2 | 165 | 180 |
| Calcium Lignosulfonate | 171.3 | 171.5 | 180 | 170 |
| Zinc Lignosulfonate | 170.5 | 170.7 | 170 | 175 |
| Copper Lignosulfonate | 171.0 | 171.5 | 190 | 195 |
| 1.50% Binder | | | | |
| Magnesium Lignosulfonate | 172.8 | 173.3 | 125 | 140 |
| Calcium Lignosulfonate | 172.6 | 172.8 | 165 | 165 |
| Zinc | | | | |

Table II-continued

Effect of the Concentration of Various Lignosulfonate Salt Binders on the Density and Green Strength of MgO Specimens; 3.0% Water on Weight of MgO. Specimens pressed at 10,000 PSI.

| Lignosulfonate Binder Concentration (% on Wt. of MgO) | Density, Lbs./Cu. Ft. | | Green Strength (PSI) | |
|---|---|---|---|---|
| | Initial | After 1 Hr. at Rm. Temp. (20°C.) | Initial | After 1 Hr. at Rm. Temp. (20°C.) |
| Lignosulfonate Copper | 172.5 | 172.5 | 140 | 135 |
| Lignosulfonate 2.25% Binder | 173.0 | 173.4 | 160 | 180 |
| Magnesium Lignosulfonate | 174.3 | 174.7 | 130 | 145 |
| Calcium Lignosulfonate | 174.3 | 174.2 | 160 | 170 |
| Zinc Lignosulfonate | 174.3 | 174.4 | 145 | 120 |
| Copper Lignosulfonate 3.0% Binder | 173.5 | 173.0 | 210 | 240 |
| Magnesium Lignosulfonate | 176.6 | 176.5 | 140 | 160 |
| Calcium Lignosulfonate | 176.0 | 175.5 | 165 | 185 |
| Zinc Lignosulfonate | 175.5 | 175.9 | 130 | 150 |
| Copper Lignosulfonate | 174.6 | 173.5 | 235 | 380 |

In each of the cases summarized in Table II, a chosen amount of a metal lignosulfonate salt was mixed in solution with an amount of water equal to 3.0% on the weight of the commercial "periclase" magnesium oxide refractory material, a crystalline form of MgO, to form a binder solution. The binder solution was added slowly to the magnesium oxide refractory material and the mixture was mixed together for a period of approximately six minutes. A portion of the refractory forming mix was then pressed at 10,000 psi into 1⅝ inch diameter by 2 inch high cylindrical specimens. The lengths of the cylinders were then measured and their "initial" densities calculated on an anhydrous basis. The cylinders were then broken in compression on a Dietert testing machine to determine "initial" green strength. The remaining mix was kept in plastic bags (to inhibit dehydration) for 1 hour at room temperature and then pressed and tested for density and green compressive strength. As can be seen by referring to Table II, the initial density of specimens pressed from mixes containing various lignosulfonates is greater than the density of the specimen which does not utilize a lignosulfonate binder at all, although the initial green strength might be greater or less than with water alone depending on the type of lignosulfonate salt that was used. As is apparent from Table II, the properties of the mixes tested, made with one particular type of commercial periclase, did not degrade substantially over one hour at room temperature. However, a degradation in the densities of the refractory bricks, pressed from MgO refractory mixes aged for a period of time, is known in the industry to be a persistant problem plaguing refractory operations. It also had been observed qualitatively that refractory mix made with commercial periclase from other manufacturers did lose density within an hour or less at room temperature. Thus, other tests were required to determine the source of the problem.

Tests were made to determine what effect, if any, the ambient temperature had on the aging characteristics of the refractory forming mix. A mixture was prepared in the manner described above with reference to Table II, using a binder solution of 3.0% water and 1.5% calcium lignosulfonate on the weight of magnesium oxide refractory material. Specimens were pressed from portions of the mixture kept in plastic bags for various periods of time at various temperatures. The results of these tests proved fruitful, and are given in Table III.

Table III

Effect of Temperature on Aging characteristics of a Refractory Forming Mix of MgO and a Binder Solution of 1.5% Calcium Lignosulfonate and 3.0% Water on Weight of MgO. Specimens Pressed at 10,000 PSI.

| Temp. | Density (Lbs./Cu. Ft.) | | | | Green Compressive Strength (P.S.I.) | | | |
|---|---|---|---|---|---|---|---|---|
| | Initial | 1 Hr. | 2 Hr. | 3 Hr. | Initial | 1 Hr. | 2 Hr. | 3 Hr. |
| 21°C | 172.4 | 172.5 | 172.9 | 172.5 | 150 | 150 | 165 | 160 |
| 35°C | 172.4 | 172.3 | 172.9 | 172.4 | 155 | 155 | 185 | 190 |
| 45°C | 172.8 | 172.2 | 171.4 | 169.8 | 160 | 195 | 240 | 295 |
| 50°C | 172.8 | 171.9 | 169.7 | 167.6 | 155 | 225 | 340 | 360 |

As can be seen with reference to Table III, the density of specimens pressed from mixes aged at higher temperatures is substantially degraded, particular at temperatures around 50°C. Refractory mix temperatures approaching 50°C are not uncommon prior to forming. Moreover, the aging characteristics of the refractory forming mixtures is found to vary considerably depending on the manufacturer of the magnesium oxide refractory material, with some mixtures aging more rapidly than others. This may result from differences in the size and shape of the magnesium oxide grains, calcining conditions, level of impurities, and so forth. However, it appears that the aging characteristics of the magnesium oxide mixtures are accelerated at higher temperatures, and thus it was determined to use 50°C as the aging temperature in further tests.

Test were made on specimens formed in the manner described above, with various metal lignosulfonate salts as binders, to determine if there were any differences in the properties of the various lignosulfonate salts as binders. The results of these tests are given in Table IV below.

higher than 10,000 PSI. Many commercial refractory presses are capable of pressing at 15,000 PSI or higher. At these higher pressures, as little as 1% or 2% water on the weight of refractory material may be adequate. Where only 1% or 2% water is present, it has been observed that the addition of a lignosulfonate salt to the binder solution provides very substantial increases in green strength of the pressed brick over bricks having water alone as a binder.

Table IV

Effect of Various Lignosulfonate Salt Binders on Aging Characteristics of MgO Refractory Forming Mixes at 50°C— 1.5% Lignosulfonate Salt and 3.0% Water on Weight of MgO Binder Solution. Specimens Pressed at 10,000 PSI.

| Binder | Density (Lbs./Cu. Ft.) | | | | Green Strength (P.S.I.) | | | |
|---|---|---|---|---|---|---|---|---|
| | Initial | 1 Hr. | 2 Hr. | 3 Hr. | Initial | 1 Hr. | 2 Hr. | 3 Hr. |
| Water Only | 169.1 | 169.1 | 169.3 | 169.6 | 165 | 185 | 225 | 450 |
| Zinc Lignosulfonate | 172.5 | 172.7 | 172.6 | 172.8 | 145 | 160 | 150 | 115 |
| Copper Lignosulfonate | 173.4 | 171.5 | 170.1 | 168.3 | 175 | 220 | 250 | 410 |
| Sodium Lignosulfonate | 172.1 | 171.8 | 169.7 | 167.7 | 170 | 235 | 235 | 465 |
| Calcium Lignosulfonate | 172.9 | 171.9 | 169.8 | 167.6 | 155 | 225 | 340 | 360 |
| Magnesium Lignosulfonate | 172.9 | 171.4 | 169.6 | 167.1 | 150 | 230 | 375 | 510 |
| Manganese Lignofulfonate | 174.4 | 173.1 | 168.4 | 166.0 | 160 | 205 | 450 | 560 |
| Chromium Lignosulfonate | 170.6 | 167.1 | 165.4 | 164.4 | 290 | 480 | 710 | 900+ |
| Iron Lignosulfonate | 172.6 | 166.9 | 163.9 | 161.6 | 220 | 525 | 910 | 860 |
| Aluminum Lignosulfonate | 172.3 | 164.4 | 163.7 | 161.0 | 255 | 810 | 900+ | 900+ |

As is apparent from Table IV, the density of all of the specimens degraded over time except those made with a zinc lignosulfonate binder solution. The mixture made with zinc lignosulfonate and water as a binder unexpectedly showed virtually no tendency to lose density over time. The results given in Table IV show that, at 3% water concentration, a decrease in brick density is accompanied by an increase in green strength. While loss of green strength can prove troublesome in handling the green bricks, it has no effect on the properties of the fired bricks. However, the (anhydrous) density of the green bricks is directly related to the density of the fired brick. Thus, density is generally considered a more significant property than green strength, and as indicated above, a green strength greater than 100 psi is adequate for most purposes. In commercial practice, refractory bricks are commonly pressed at pressures Since the most common lignosulfonate salts obtained from the papermaking process are sodium lignosulfonate and calcium lignosulfonate, I wished to determine if small amounts of zinc compounds added to solutions of these salts would prove effective. Thus, zinc oxide was added in various amounts to a binder solution of calcium lignosulfonate and water, with the solution also containing lignosulfonic acid which aids in the ionization of the zinc from the zinc oxide. Specimens of the mixture of the magnesium oxide material and the binder solution were formed at 10,000 psi pressure, and calculations of density and green strength were made as described above. Specimens were formed immediately after mixing and also after the mixture had aged for 3 hours at 50°C. The results of these tests are shown in Table V.

Table V

Effect of addition of ZnO on the Stability of MgO Refractory Forming Mixes Made With a Calcium Lignosulfonate Binder Solution— 1.5% Calcium Lignosulfonate and 3.0% Water on Weight of MgO, Aging at 50°C. Specimens pressed at 10,000 psi.

| ZnO, % of Calcium Lignosulfonate by Weight | pH | Density (Lbs./Cu.Ft.) | | | | Green Strength (P.S.I.) | | | |
|---|---|---|---|---|---|---|---|---|---|
| | | Initial | 1 Hr. | 2 Hr. | 3 Hr. | Initial | 1 Hr. | 2 Hr. | 3 Hr. |
| 0.0% | 3.0 | 172.9 | 171.9 | 169.7 | 167.6 | 155 | 225 | 340 | 360 |
| 2.0% | 3.5 | 172.5 | 172.4 | 172.5 | 172.9 | 170 | 160 | 165 | 175 |
| 4.0% | 4.6 | 172.8 | 172.8 | 172.9 | 172.4 | 145 | 170 | 160 | 160 |
| 6.0% | 5.4 | 172.5 | 172.6 | 172.4 | 172.8 | 145 | 165 | 145 | 165 |

Table VI

Effect of Addition of ZnO on the Stability of MgO Refractory Forming Mixes Made With a Calcium Lignosulfonate Binder Solution — 1.5% Calcium Lignosulfonate and 3.0% Water on Weight of MgO. Specimens Pressed at 10,000 PSI. % ZnO on Weight of Calcium Lignosulfonate

| Binder | Density (Lbs./Cu.Ft.) Initial | Density (Lbs./Cu.Ft.) 2 Hrs. at 50°C | Green Strength (P.S.I.) Initial | Green Strength (P.S.I.) 2 Hrs. at 50°C |
|---|---|---|---|---|
| Water Only | 171.6 | 171.3 | 140 | 186 |
| Calcium Lignosulfonate | 174.9 | 170.1 | 116 | 368 |
| Calcium Lignosulfonate and 0.5% ZnO | 174.2 | 170.8 | 117 | 332 |
| Calcium Lignosulfonate and 1.10% ZnO | 174.6 | 174.8 | 105 | 198 |
| Calcium Lignosulfonate and 2.21% ZnO | 174.4 | 174.8 | 96 | 143 |
| Calcium Lignosulfonate and 4.35% ZnO | 174.4 | 174.6 | 129 | 135 |

An examination of the test results shown in Table V leads to the conclusions that: (1) it is possible to stabilize the densities of MgO refractory mixtures formed with lignosulfonate binders other than zinc lignosulfonate by adding a zinc compound to the binder solution which supplies zinc ions in water solution, and (2) it is possible to stabilize a calcium lignosulfonate (with lignosulfonate acid) binder solution-MgO refractory mixture with the addition of just 2.0% ZnO on the weight of the calcium lignosulfonate. The presence of the lignosulfonic acid is indicated by the acid pH's of the binder solution as shown in Table V.

Further tests were made as above on another batch of refractory forming mixture. The results of these tests are given in Table VI. The initial densities of the refractory bricks tested as shown in Table VI may be seen to deviate substantially from the results shown in Table V. This is a common result, and demonstrates the variability in the characteristics of commercially purchased periclase refractory material.

From Table VI it is seen that about 1.1% ZnO on the weight of Calcium Lignosulfonate is sufficient to stabilize the refractory forming mixture and prevent substantial loss of density in the pressed brick over a period of time. This corresponds to about 0.9% zinc on the weight of Calcium Lignosulfonate available to form free zinc ions in solution. It is possible that even less zinc would still be effective to stabilize the refractory forming mixture, that is, to ensure that the density of brick pressed from the aged refractory forming mixture is at least as great as the density of bricks made with only water as a binder.

Additional tests were made to determine the effect of the concentration of lignosulfonate salt in the binder solution. These tests were carried out as follows:

1,000 grams of commercial periclase MgO refractory material were placed together into a mixing bowl. A desired quantity of binder material was dissolved in a total of 30 grams of water (3.0% H$_2$O on weight of MgO) to form a binder solution, and the solution was added slowly to the periclase with the mixer in operation. Mixing was continued for six minutes after which 97 grams of refractory forming mix were weighed out into each of eight small plastic bags. The contents of four of the bags were then molded into small 1⅝ inch diameter × 2 inch cylinders in a hand operated press at 10,000 psi. The lengths of the cylinders were then measured and their "initial" densities calculated on an anhydrous basis. The cylinders were then broken in compression on a Dietert testing machine to determine "initial" green strength. The remaining 4 plastic bags of mix were placed into an oven at 50°C. for 3 hours, cooled and then tested for density and green compressive strength. The decrease in density between the "initial" determination and the determination after aging is taken as a measure of the loss of workability of the mix. The results of this investigation are presented in Table VII, showing the effect of the four binder solutions tested on the initial and aged densities of the MgO mixes.

Table VII

Effect of Various Binders On Properties of Refractory Periclase Mixes — 3.0% Water on Weight of MgO. Specimens Pressed at 10,000 PSI.

| Binder | Density (Lbs./Cu.Ft.) Initial | Density After aging Mix 3 Hrs. at 50°C. | Green Comp. Strength PSI Initial | Green Comp. Strength PSI After aging Mix 3 Hrs. at 50°C. |
|---|---|---|---|---|
| 0.00% Binder | | | | |
| Water only | 173.7 | 172.4 | 143 | 134 |
| 0.75% Binder | | | | |
| Sodium Lignosulfonate | 175.1 | 173.6 | 108 | 163 |
| Calcium Lignosulfonate | 175.3 | 171.9 | 88 | 226 |
| Zinc Lignosulfonate | 176.0 | 174.3 | 113 | 111 |
| Calcium Lignosulfonate plus ZnO (4.0% ZnO on weight of Lignosulfonate | 175.9 | 175.0 | 119 | 105 |
| 1.50% Binder | | | | |
| Sodium Lignosulfonate | 176.7 | 174.0 | 127 | 224 |
| Calcium Lignosulfonate | 177.0 | 173.3 | 134 | 227 |
| Zinc Lignosulfonate | 177.7 | 177.0 | 107 | 127 |
| Calcium Lignosulfonate plus ZnO | 177.7 | 177.3 | 107 | 121 |
| 2.25% Binder | | | | |
| Sodium Lignosulfonate | 179.6 | 176.0 | 86 | 215 |
| Calcium Lignosulfonate | 178.2 | 170.6 | 149 | 260 |
| Zinc Lignosulfonate | 180.5 | 180.5 | 104 | 114 |
| Calcium Lignosulfonate plus ZnO | 179.6 | 179.9 | 110 | 122 |
| 3.00% Binder | | | | |

Table VII-continued

Effect of Various Binders On Properties of Refractory Periclase Mixes — 3.0% Water on Weight of MgO. Specimens Pressed at 10,000 PSI.

| Binder | Density (Lbs./Cu.Ft.) Initial | Density After aging Mix 3 Hrs. at 50°C. | Green Comp. Strength PSI Initial | Green Comp. Strength PSI After aging Mix 3 Hrs. at 50°C. |
|---|---|---|---|---|
| Sodium Lignosulfonate | 181.9 | 178.4 | 97 | 444 |
| Calcium Lignosulfonate | 178.3 | 173.9 | 292 | 432 |
| Zinc Lignosulfonate | 183.6 | 182.2 | 96 | 110 |
| Calcium Lignosulfonate plus ZnO | 181.3 | 181.9 | 102 | 123 |

The following observations can be made from an examination of Table VII:
1. The zinc - containing products, zinc lignosulfonate and zinc oxide mixed with calcium lignosulfonate, performed comparably with or were superior to the calcium lignosulfonate and the sodium lignosulfonate as densifiers, and were significantly better in stabilizing the refractory forming mixture.
2. The effect of the zinc containing products in inhibiting workability loss is not as substantial at low levels of binder solution treatment, i.e., below 0.75%.
3. In general, it appears that loss of workability and density in an MgO refractory forming mix is accompanied by an increase in green compressive strength.

From the foregoing tests it is determined that about 0.75% or more solid zinc containing lignosulfonate binder is sufficient to stabilize a refractory forming mixture. Since the minimum amount of water utilized in refractory mixes is about 1% on the weight of refractory material, the binder solution should constitute about 1.75% or more by weight of the refractory material. The amount of water in the refractory forming mixture may be increased, but as noted above, the workability of the refractory forming mixture and the green strength of the pressed brick degrade substantially if more than about 4% or 5% water is present. Thus a binder solution containing more than about 5% water and 5% zinc-containing lignosulfonate solids would not be desirable. The desired proportions will vary, of course, depending on the properties of the refractory material containing magnesium oxide and the pressure at which the refractory shapes will be pressed. Generally, it is desirable to use the minimum amount of water and lignosulfonate binder that will provide adequate density and green strength.

Further tests were run as above to determine if zinc compounds, such as zinc salts, providing zinc ions in solution, could stabilize a refractory forming mixture having a lignosulfonate salt binder solution. The results of these tests are given in Table VIII below.

TABLE VIII

Effect of Various Zinc Salts on Properties of Calcium Lignosulfonate Binder Solution Refractory Periclase Mixes. 3.0% Water on Weight of MgO, 1.5% Calcium Lignosulfonate on Weight of MgO. Specimens Pressed at 10,000 PSI

| Binder | Density (Lbs./Cu.Ft.) Initially | Density (Lbs./Cu.Ft.) After aging Mix 2 Hrs. at 50°C |
|---|---|---|
| Calcium Lignosulfonate alone | 172.9 | 169.2 |
| Calcium Lignosulfonate with 6% Zinc Sulfate on weight of Calcium Lignosulfonate | 173.2 | 173.1 |
| Calcium Lignosulfonate with 6.4% zinc chloride on weight of Calcium Lignosulfonate | 172.6 | 173.7 |

As is apparent from Table VIII, both zinc sulfate and zinc chloride were effective to stabilize the refractory forming mixture and thus prevent substantial loss of density of brick pressed from a refractory forming mix aged over a period of time. It may be noted that both zinc sulfate and zinc chloride dissociate in water solution to provide free zinc ions. These tests also indicated that the zinc compound and/or the lignosulfonate salt could be added dry to the particulate refractory material with water being added later, without affecting the results.

From my investigations, it appears that the zinc compound added to the lignosulfonate salt binder solution must be capable of dissociating in solution to provide zinc ions. A zinc salt, such as $ZnCl_2$, should be capable of dissociating in a neutral water solution. Some zinc compounds, such as ZnO, do not dissociate in a neutral water solution but will do so in an acidic solution, as in the case where lignosulfonic acid is present along with calcium lignosulfonate in solution. From the test results reported above, it appears that about 1% zinc on the weight of the lignosulfonate salt is sufficient to stabilize the refractory forming mixture.

It is understood that my invention is not confined to the particular embodiments described herein as illustrative of my invention, but embraces all such modified forms thereof as may come within the scope of the following claims.

I claim:
1. A refractory forming mixture suitable for pressure forming into refractory shapes, consisting essentially of:
   a. about 90% to about 98% by weight particulate refractory material containing magnesium oxide; and
   b. about 2% to about 10% by weight of densifying binder solution intermixed with said particulate refractory material, said binder solution consisting essentially of a solution of zinc lignosulfonate and water, said zinc lignosulfonate being present in an amount sufficient to stabilize the refractory forming mixture for up to about 3 hours at aging temperatures above 35°C to prevent substantial loss of density of refractory shapes pressed from the refractory forming mixture, the water being from about 1% and not exceeding about 5% by weight of the refractory material.

2. The refractory forming mixture as specified in claim 1 wherein said particulate refractory material includes a chromium refractory compound.

3. A refractory mixture suitable for pressure forming into refractory shapes, consisting essentially of:
   a. about 90% to about 98% by weight particulate refractory material containing magnesium oxide; and b. about 2% to about 10% by weight of densifying binder solution intermixed with said particulate refractory material, said binder solution consisting essentially of a solution of a zinc compound and a lignosulfonate salt, other than zinc lignosulfonate, in water, said zinc compound being selected from the group consisting of zinc compounds which provide zinc ions in a water solution containing said lignosulfonate salt and being contained in said binder solution in an amount sufficient to provide at least about 0.9% zinc ions based on the weight of said salt and sufficient to stabilize the refractory forming mixture for up to about 3 hours at aging temperatures above 35°C to prevent substantial loss of density of refractory shapes pressed from the refractory forming mixture, the water being from about 1% and not exceeding about 5% by weight of the refractory material.

4. The refractory forming mixture as specified in claim 3 wherein said binder solution contains at least about 1.0% zinc on the weight of said lignosulfonate salt.

5. A refractory forming mixture suitable for pressure forming into refractory shapes, consisting essentially of:
   a. about 90% to about 98% by weight particulate refractory material containing magnesium oxide; and
   b. about 2% to about 10% by weight of a densifying binder solution intermixed with said particulate refractory material, said binder solution consisting essentially of a solution of a zinc compound and a lignosulfonate salt, other than zinc lignosulfonate, in an acidic water solution, said zinc compound being selected from the group consisting of zinc compounds which provide zinc ions in an acidic water solution containing said lignosulfonate salt and being contained in said binder solution in an amount sufficient to provide at least about 0.9% zinc ions based on the weight of said salt and sufficient to stabilize the refractory forming mixture for up to about 3 hours at aging temperatures above 35°C to prevent substantial loss of density of refractory shapes pressed from the refractory forming mixture, the water being from about 1% and not exceeding about 5% by weight of the refractory material.

6. The refractory forming mixture as specified in claim 5 wherein said binder solution contains at least about 1.0% zinc on the weight of said lignosulfonate salt.

7. The refractory forming mixture as specified in claim 5 wherein said zinc compound consists of zinc oxide.

8. A method of making refractory forming mixture containing magnesium oxide suitable for pressure forming into refractory shapes, comprising:
mixing with water a lignosulfonate salt, other than zinc lignosulfonate, a zinc compound selected from the group of zinc compounds which provide zinc ions in a water solution containing said lignosulfonate salt, and particulate refractory material containing magnesium oxide, in a proportion by weight of between about 2% and about 10% of the densifying combination of said water, lignosulfonate salt and zinc compound, and between about 90% to 98% of said refractory material, said zinc compound being present in an amount sufficient to provide at least about 0.9% zinc ions based on the weight of said salt and sufficient to stabilize the refractory forming mixture for up to about 3 hours at aging temperatures above 35°C to prevent substantial loss of density of refractory shapes pressed from the refractory forming mixture, the water being from about 1% and not exceeding about 5% by weight of the refractory material.

9. The method of making refractory forming mixture as specified in claim 8 wherein said zinc compound is selected from the group consisting of zinc chloride and zinc sulfate and wherein said lignosulfonate salt is selected from the group consisting of calcium lignosulfonate and sodium lignosulfonate.

10. The method of making refractory forming mixture as specified in claim 8 wherein said zinc compound, said lignosulfonate salt, and said particulate refractory material are mixed with an acidic water solution, and wherein said zinc compound is selected from the group consisting of zinc compounds which provide zinc ions in an acidic water solution containing said lignosulfonate salt.

11. The method of making refractory forming mixture as specified in claim 10 wherein said zinc compound is zinc oxide.

12. A method of making refractory forming mixture containing magnesium oxide suitable for pressure forming into refractory shapes, comprising:
mixing with water zinc lignosulfonate and a particulate refractory material containing magnesium oxide, in a proportion by weight of between about 2% and about 10% of the densifying combination of said water and zinc lignosulfonate, and between about 90% to 98% of said refractory material, to yield a refractory forming mixture, said zinc lignosulfonate being contained in said refractory forming mixture in an amount sufficient to stabilize the refractory forming mixture for up to about 3 hours at aging temperatures above 35°C to prevent substantial loss of density of refractory shapes pressed from said refractory forming mixture, the water being from about 1% and not exceeding about 5% by weight of the refractory material.

* * * * *